July 16, 1957    R. E. RUSKIN ET AL    2,799,164
APPARATUS FOR DETERMINING THE RATE OF
INDICATED AIR SPEED ACCELERATION
Filed March 23, 1954    2 Sheets-Sheet 1

INVENTORS.
ROBERT E. RUSKIN
GEORGE W. S. JOHNSON

July 16, 1957

R. E. RUSKIN ET AL 2,799,164

APPARATUS FOR DETERMINING THE RATE OF
INDICATED AIR SPEED ACCELERATION

Filed March 23, 1954

INVENTORS.
ROBERT E. RUSKIN
GEORGE W. S. JOHNSON

United States Patent Office 2,799,164
Patented July 16, 1957

2,799,164

APPARATUS FOR DETERMINING THE RATE OF INDICATED AIR SPEED ACCELERATION

Robert E. Ruskin and George W. S. Johnson, Prince Georges County, Md.

Application March 23, 1954, Serial No. 418,153

9 Claims. (Cl. 73—182)

This invention relates to an apparatus for determining the rate of change of a variable condition.

It is an object of this invention to provide an apparatus for determining the rate of indicated air speed acceleration and deceleration of an aircraft in which the condition responsive means is responsive to the changes of the pitot and static pressure.

A further object of this invention is to provide a novel instrument in accordance with the above object wherein a means is provided for indicating the algebraic difference in response of two elements each responsive to rate of change of pressure.

It is another object of this invention to provide an apparatus for determining the rates of increase and decrease of the velocity of a fluid moving relative to a means of determining velocity pressure and static pressure.

A further object of this invention is to provide an apparatus for determining rates of increase and decrease of the velocity of a fluid moving relative to an impact pressure and static pressure pickup means while automatically compensating for various values of the fluid pressure.

Another object of this invention is to provide a novel apparatus in accordance with the above objects whereby a means is provided for automatically maintaining proper indication of rates of changes of indicated air speed independent of the value of air speed at which the change of air speed occurs.

A further object of this invention is to provide a new and novel instrument for determining the rate of increase and decrease of indicated air speed in which the various moving components are counter balanced such that the indication is substantially unaffected by acceleration forces in any direction.

A still further object of this invention is to provide an apparatus which is substantially unaffected by the temperature of the mechanism or of the air in the apparatus for determining the rates of increase and decrease of indicated air speed.

A further object of this invention is to provide a novel apparatus in accordance with the above objects that is simple in construction, has few parts, positive action, is substantially accurate under all conditions of normal operation.

Other objects and features of the invention will be readily apparent to those skilled in the art from the specification and appended drawings.

Two embodiments of the invention, one mechanical and one electro-mechanical are illustrated in the accompanying drawings, but it is to be expressly understood that said drawings are for purposes of illustration only and are not to be taken as a definition of the limits of the invention, reference being made to the appended claims for this purpose.

In the accompanying drawings, like reference numbers refer to like parts throughout the several views.

Figure 1:
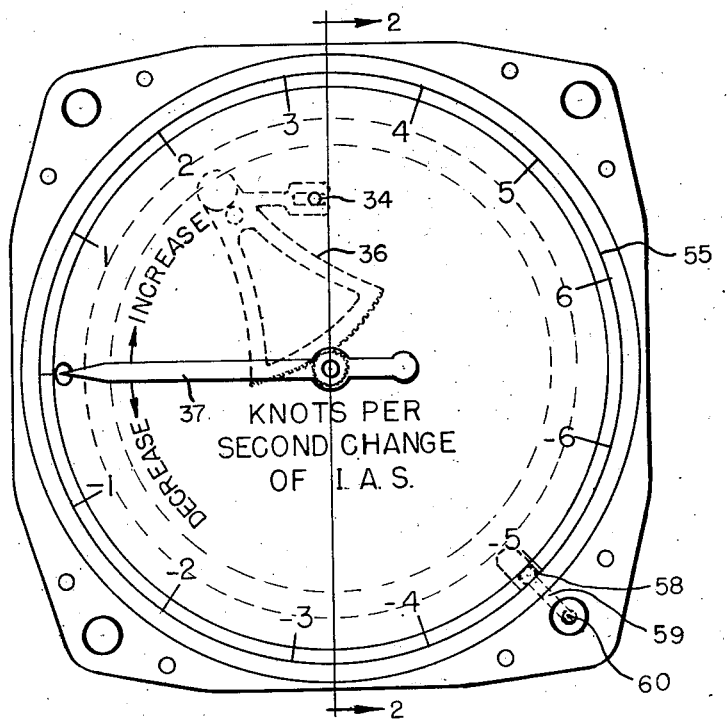
Fig. 1 is a front view of the instrument embodying the present invention showing the pointer actuating gears in phantom.
Figure 2:
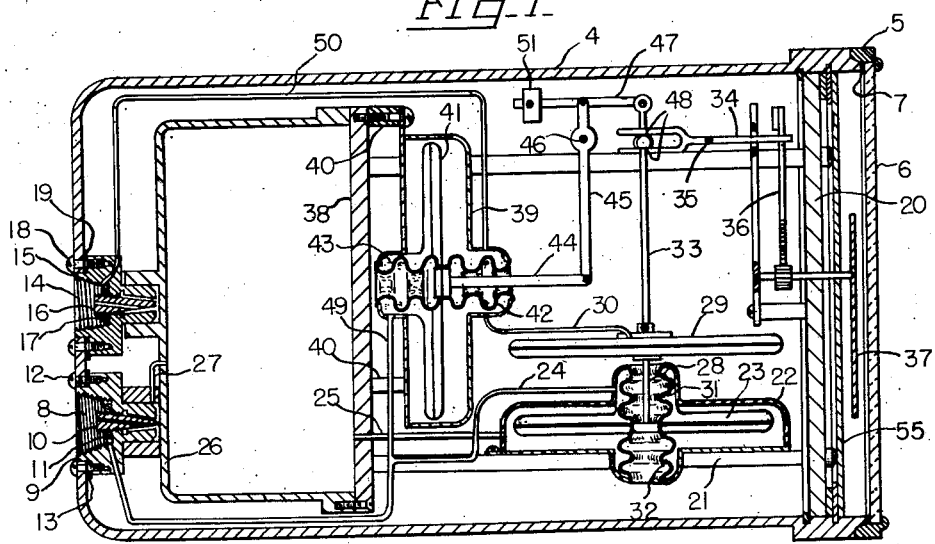
Fig. 2 is a section taken along the line 2—2 of Fig. 1.

In the rate of air speed acceleration instrument shown in Figs. 1 and 2, there is provided an airtight casing 4, closed at its front by a stationary supporting ring 5, in which is disposed a transparent window 6, the parts being sealed by the rubber gaskets 7. At the rear of the casing 4 there is shown an opening 8 for connection to the pitot line of a Pitot static tube. In said opening is a threaded insert 9 in which is mounted a needle valve 10 with a lock nut 11 for adjusting the flow of the air or other fluid entering certain portions of the instrument. Threaded insert 9 is securely mounted on case 4 by screws 12 and sealed with a gasket 13. Another opening 14 at the rear of casing 4 is for connecting to the static line of a Pitot static tube. A threaded insert 15 mounted in opening 14 contains a needle valve 16 with a lock nut 17 for adjusting the flow of air or other fluid entering casing 4. Threaded insert 15 is securely mounted on casing 4 by screws 18 and sealed with a gasket 19. Static pressure applied through needle valve 16 enters the interior of casing 4 by first entering the clearance at the end of needle valve 16 and thence across and around insert 16 through the clearance between insert 15 and the surrounding boss on tank 26.

To the mounting disk 20 by means of posts 21 is rigidly mounted pressure tight housing 22 in which is mounted pressure responsive diaphragm 23 which forms a chamber isolating the pressure inside itself from the pressure in the remainder of housing 22, the diaphragm being in turn connected to the pitot pressure through the tube 24 and insert 9. The interior of housing 22 is in communication through a tubing 25 with a reservoir or tank 26 which in turn is in communication with the pitot pressure through tube 27 and needle valve 10.

To pressure diaphragm 23 is mounted a post 28 which sustains diaphragm 29 which is connected to the static pressure through flexible tubing 30 and insert 15 and which forms a chamber isolating the pressure within itself from the pressure in the remainder of housing 4. The air in the space confined by the housing 22 is sealed from communication with the air in the space outside of the housing 22 by a corrugated bellows or other expansible diaphragm 31 and 32, which permit axial movement of the connecting post 28 without leakage of air between the inside and outside of housing 32. Simultaneously the pressure on the outside of housing 22 produces equal axial forces on diaphragms 31 and 32 thereby producing no axial force or movement of connecting post 28. This configuration permits expansion and contraction of diaphragm 23 and axial movement of connecting post 28 without change in the free volume of the case 4.

Changes of altitude of the aircraft while maintaining a constant indicated air speed produce an equal change in both the static and the pitot pressure. When this change of altitude occurs while maintaining constant indicated air speed an equal expansion occurs in diaphragms 23 and 29, thus producing movement of the lower surfaces, as depicted in Fig. 2, of diaphragms 23 and 29 and the connecting post 28 with no movement of any other components of the instrument.

An increase in indicated air speed produces a rate of change of pitot pressure which is algebraically greater than the rate of change of static pressure, whether these changes of pitot and static pressure are positive, negative, or zero. Thus is produced a net downward movement, as depicted in Fig. 2, of the diaphragm 29 and connecting link 33, and rotating the arm 34 around its pivot point 35, with a consequent sideward movement of the gear segment 36 of Fig. 1 to the right or counterclockwise and rotation of the pointer 37 in a clockwise direction as shown in Fig. 1. A decrease of indicated air speed produces movements in the opposite directions.

To post 21 is rigidly mounted a disk 38 which forms one end of tank 26 and to which isolating housing 39 is rigidly mounted through spacer blocks 40. Inside of housing 39 are mounted diaphragms 41 and bellows 42 and 43 in a similar manner to that employed in housing 22, diaphragm 41 forming a chamber isolating the pressure within itself from the pressure of the remainder of housing 39.

Higher values of indicated air speed produce a greater differential pressure between the diaphragm 41 and its surrounding air enclosed in housing 39. Referring to Fig. 2, this increase in differential pressure as the air speed is increased produces a movement of link 44 to the right, a counterclockwise rotation of the lever 45 about its pivot point 46, a movement of link 47 to the left, thereby moving the top of the link 33 to the left so that its points of application 48 of vertical force is moved to a point further from the pivot point 35, thereby decreasing the angle of rotation of the arm 34 about its pivot point 35 for a given vertical movement of link 33. In this manner the mechanism automatically compensates for the higher rate of change of pitot pressure which occurs in diaphragm 23 at higher air speeds for a given rate of change of indicated air speed.

Figure 3:
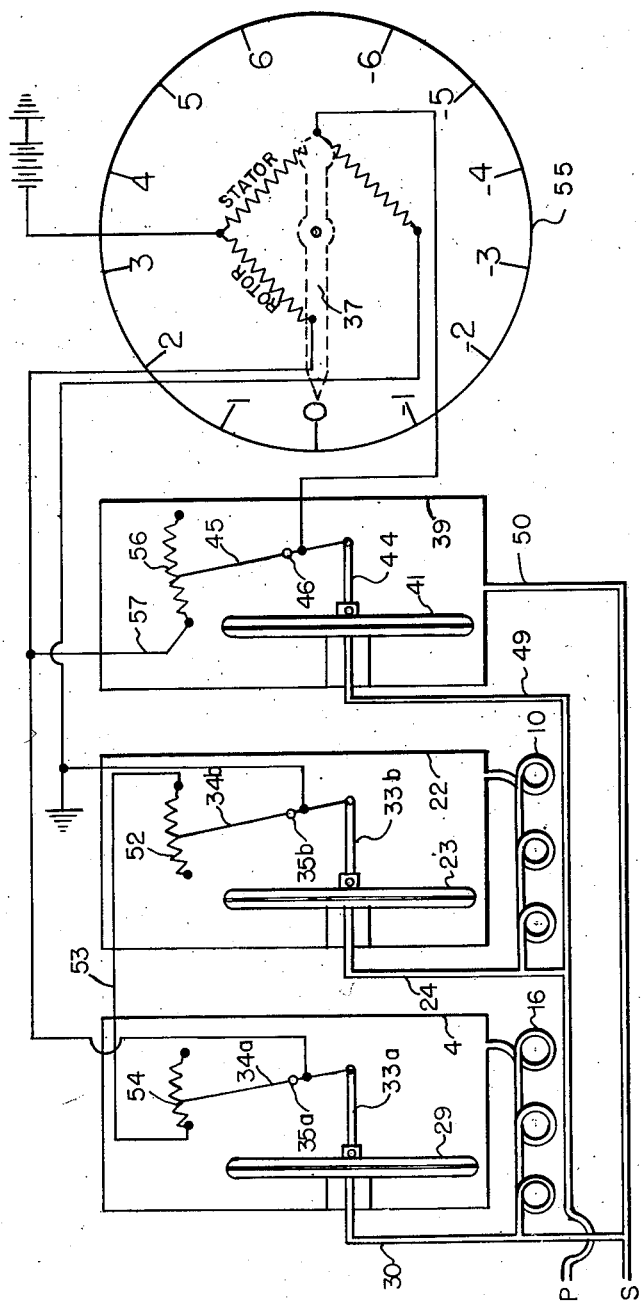
Fig. 3 is a more or less diagrammatic view, partly in section of one electro-mechanical embodiment incorporating the main principles of this invention.

The method of determining the rate of indicated air speed acceleration is as follows: The pitot pressure is maintained continuously inside of a pressure sensitive element, such as pressure diaphragm 23 as shown in Figs. 2 and 3. The pitot pressure is simultaneously applied to a flow restriction device 10 which is in communication with the space surrounding the diaphragm 23 and enclosed by the housing 22 in order that the temporary differential effect of the pressure surrounding the pressure diaphragm 23 and that within the diaphragm may be operative to cause movements of a pointer 37, in Figs. 1, 2, and 3 in accordance with the rate of change of pitot pressure. This movement of the pointer 37 with rate of change of pitot pressure must be modified in order to preclude movement of the pointer 37 when the pitot pressure is changed due to changes of altitude or static pressure when the indicated air speed is maintained constant. In order to achieve this modification of the pointer movement, the static pressure of the aircraft pitot-static system is maintained continuously inside of a second diaphragm 29 and is simultaneously applied through needle valve 16 to the space surrounding the diaphragm 29 and enclosed by the instrument case 4 in order that the temporary differential effect of the pressure surrounding the pressure diaphragm 29 and that within this diaphragm may be operative to reduce the movements of the pointer 37 in accordance with the rate of change of static pressure, such that the resultant movement of the pointer 37 is in accordance with the algebraic difference between the rate of change of pitot pressure and the rate of change of static pressure. This movement of the pointer in accordance with the algebraic difference between the rate of change of pitot pressure and rate of change of static pressure must be further modified in order to cause the movement of the pointer 37 to be in accordance with the rate of change of indicated air speed since that indicated air speed is not proportional to the difference between the pitot and static pressure, but rather, is proportional to the square root of the pitot-static pressure difference, with the result that a given change of air speed causes a greater pitot pressure difference at high air speeds than at low air speeds. In order to achieve this further modification of the pointer movement, the continuous pitot static pressure difference is maintained between a third pressure diaphragm 41 and the space surrounding said diaphragm and enclosed in a housing 39, whereby increased pitot-static pressure difference causes an expansion of this diaphragm, and thereby causes at higher air speeds a reduction in the pressure sensitivity of the instrument by changing the lever ratio of arm 34, whereby the sensitivity of the instrument to rate of change of air speed is substantially constant over a wide speed range.

A given rate of change of pitot-static pressure difference produces a given indication of rate of change of air speed independent of the altitude at which the indicated air speed change occurs. Therefore, since this instrument indicates the rate of change of indicated air speed, its indication is substantially independent of the altitude at which the change of pitot-static pressure difference occurs. Altitude compensation is automatically achieved in the method of determining rate of change of indicated air speed described herein.

Variations of air temperature in previous instruments for determining rate of change of pressure, i. e. rate of climb indicators, produce an error due to the air in the case expanding or contracting with temperature change, thereby producing an increase or decrease in differential pressure between the air enclosed in the diaphragm and that surrounding the diaphragm. In the invention described herein this error is eliminated by the incorporation of two pressure diaphragms 23 and 29 and associated linkages arranged in such a manner that equal changes in the differential pressure applied to both pressure diaphragms produces movements of the diaphragms and associated linkages whereby no net effect on the indicator 37 is a zero change of indication. Since this instrument is insensitive to expansion and contraction of the air within the instrument no thermal insulation is required. Specifically this compensation for changes in the pressure of the air enclosed within the various spaces due to temperature change is achieved as follows for an increase in air temperatures: The air enclosed in tank 26 increases in pressure thereby producing a flow of air through tube 25 into housing 22 thereby increasing the pressure of the air surrounding the pressure diaphragm 23 until pressure is equalized by exhausting air through tube 27 and needle valve 10. Simultaneously the air enclosed in case 4 and surrounding pressure diaphragm 29 also increases in pressure until said pressure is equalized by exhausting air through needle valve 16. These two simultaneous and equal pressure increases produce upward movement (referring to Fig. 2) of the lower surface of diaphragm 23, connecting post 28, and the lower surface of diaphragm 29 equal to the movement of the upper surface of diaphragm 29 downward relative to the lower surface of this diaphragm. Therefore, connecting link 33 has no movement. A decrease of air temperature throughout the instrument produces movements in the opposite direction, which produce no movement to similarly compensate to each other and result in no movement of connecting link 33 or the indicator pointer 37.

Changes in temperature of the air inside and surrounding the pressure diaphragms 41 produce no movements since the space inside of the pressure diaphragm 41 is in unrestricted communication through tube 49 to the pitot pressure system, and the air surrounding pressure diaphragm 41 is in unrestricted communication through tube 50 to the static pressure system.

It is unnecessary to employ an isoelastic metal in the pressure diaphragms 23 and 29 or to provide for modifying their lever ratios by means of bimetallic compensators since in this invention temperature compensation for change of stiffness (i. e. spring rate) of the pressure diaphragms 23 and 29 is automatically achieved by the modification of the lever ratio of arm 34 produced by the simultaneous thermal expansion or contraction of the diaphragm 41. When the temperature decreases, pressure diaphragms 23 and 29 increase in stiffness so that less movement of link 33 is produced by a given pressure differential. The same temperature decreases produces a contraction of pressure diaphragm 41 which moves link 44 to the left (as depicted in Fig. 2), rotating lever 45 clockwise about its pivot point 46, which in turn moves link 47 to the right, thereby producing an increased rotation of arm 34 about pivot point 35 to compensate for the reduced movement of link 33 due to the increased stiffness of pressure diaphragms 23 and 29. For an increase in temperature and consequent decrease in stiffness of the pressure diaphragms an effect is produced opposite to that hereinbefore described.

Expansion and contraction of the pressure diaphragms 23 and 29 with changes of temperature are automatically compensated as follows: For a decrease in temperature the connecting post 28 and the bottom surface (as depicted in Fig. 2) of pressure diaphragms 23 and 29 are moved upward by an amount equal to the movement of the upper surface of pressure diaphragm 29 downward relative to the lower surface of pressure diaphragm 29. Therefore, no movement is produced in connecting link 33 or pointer 37. The contraction of pressure diaphragm 41 is advantageously utilized as described in the preceding paragraph. For an increase in temperature, an effect is produced opposite to that hereinbefore described.

A single counterbalance weight 51 of Fig. 2 provides counterbalancing of pressure diaphragms 23, 29 and 41, connecting post 28, connecting link 33, corrugated sealing bellows 31, 32, 42 and 43, and connecting links 44 and 47 and lever 45. The arm 34, gear segment 36, and pointer 37 are each self balanced in the usual manner.

Fig. 3 shows diagrammatically one electro-mechanical embodiment of this invention. Using three substantially identical differential pressure transducers of the variable resistance type, the pressure diaphragm 23 is connected through tubing 24 to the pitot pressure of a pitot-static system and is in communication through a flow restrictive device 10 with a space surrounding pressure diaphragm 23 and enclosed in housing 22. Increasing the pitot pressure produces an expansion of the pressure diaphragm 23, moving connecting link 33b to the right as depicted in Fig. 3, thereby producing an increase in the resistance winding 52 from the contactor arm 34b to the wire lead 53.

In a similar manner static pressure inside of the pressure diaphragm 29 is in communication through flow restrictive device 16 with the space surrounding pressure diaphragm 29 and enclosed in housing 4. Increasing the static pressure produces an expansion of the pressure diaphragm 29, moving connecting link 33a to the right as depicted in Fig. 3, thereby producing a decrease in the resistance winding 54 from the contact arm 34a to a wire lead 53. A decrease of pitot and static pressure produces the opposite movement by contraction of pressure diaphragms 23 and 29.

A rate of increase in indicated air speed produces a rate of change of pitot pressure which is algebraically greater than the rate of change of static pressure, whether these changes of pitot and static pressure are positive, negative, or zero. Thus is produced a net increase in the combined resistance of the resistive windings 52 and 54 to the contact arms 34b and 34a. A Wheatstone bridge resistance indicator 55 is calibrated to indicate directly in rate of indicated air speed acceleration. This indicator is of the standard ratio meter type, such as is ordinarily used in aircraft temperature indicators. This indicator provides an indication proportional to the resistance of winding 52 minus that of winding 54. The amount of rotation of the needle 37 is reduced whenever a parallel resistor 56 is connected in such a manner as to shunt the rotor and stator coils. The amount of reduction is dependent on the value of the resistor 56, thus providing a change in sensitivity with change in the differential pressure applied to the diaphragm 41 with changes in indicated air speed.

Higher values of indicated air speed produce a greater differential pressure between the diaphragm 41 and its surrounding air enclosed in housing 39. Referring to Fig. 3, this increase in differential pressure as the air speed is increased produces a movement of link 44 to the right, thereby reducing the resistance of the resistive winding 56 between the contact arm 45 and the wire lead 57, thereby reducing the sensitivity of the indicating meter 55 and thus automatically compensating for the higher rate of change of the pitot pressure at higher air speeds which occurs in diaphragm 23 for a given rate of change of indicated air speed.

Compensation for expansion and contraction of the air enclosed within the various spaces due to temperature changes is achieved in substantially the same manner as in the mechanical embodiment shown in Fig. 2.

For an increase in air temperature the air enclosed in housing 22 increases the pressure surrounding pressure diaphragm 23 until said pressure is equalized by exhausting air through the restrictive device 10 and tube 24. Simultaneously the air enclosed in housing 4 and surrounding pressure diaphragm 29 also increases in pressure until said pressure is equalized by exhausting air through restrictive device 16 and tube 30. These two simultaneous and equal pressure increases produce equal compressive movements of the pressure diaphragms 23 and 29. Therefore, the net effect of this expansion of the air is a zero change in the combined resistance of the two transducers. A decrease of air temperature throughout the instrument produces movements in the opposite direction, which similarly compensate each other and result in no change in the total resistance of the two transducers.

Expansion and contraction of the air inside and surrounding the pressure diaphragm 41 due to changes in temperature produce no movements of said diaphragm since the space inside of said diaphragm is in unrestricted communication through tube 49 to the pitot system, and the air surrounding pressure diaphragm 41 is in unrestricted communication through tube 50 to the static system.

As in the mechanical embodiment Fig. 1, it is unnecessary to employ an isoelastic metal in the pressure diaphragms 23 and 29 or to provide for modifying their lever ratios by means of bimetallic compensators since in this invention temperature compensation for changes of stiffness (i. e. spring rate) of the pressure diaphragms 23 and 29 is automatically achieved by the modification of the sensitivity of the indicator 55 by the simultaneous contraction or expansion of the pressure diaphragm 41. When the temperature decreases, pressure diaphragms 23 and 29 increase in stiffness so that less movement of the contact arm 34b and 34a is produced by a given pressure differential. The same temperature decrease produces a contraction of pressure diaphragm 41, which moves the contact arm 45 to the right as depicted in Fig. 3, thereby increasing the sensitivity of the indicator 55. For an increase in temperature and consequent decrease in stiffness of the pressure diaphragms an effect opposite to that hereinbefore described is produced.

Expansion and contraction of the pressure diaphragms 23 and 29 with changes of temperature are automatically compensated as follows: For a decrease in temperature the pressure diaphragms 23 and 29 contract equally, thereby producing equal changes in resistance, decreasing resistance winding 52 and increasing resistance winding 54. Therefore, no movement is produced in the indicator 55. The contraction of pressure diaphragm 41 is advantageously utilized as described in the preceding paragraph. For an increase in temperature, an effect is produced opposite to that hereinbefore described.

To provide for adjustment of the zero reading of the instrument, disk 20 is provided with a notch 58 at its periphery as shown in Fig. 1 in which is disposed a cam 59 eccentrically mounted on an adjusting shaft 60 which can be rotated from outside the case. To provide for this rotational movement of the internal assembly while maintaining rigidity of mounting of the internal assembly, the rear of the tank 26 is pivotally supported at its center by the static pressure connection insert 15.

This invention broadly provides a novel means for indicating the rate of change of a variable condition and in its specific embodiments described herein shows two preferred forms for indicating rate of change of indicated airspeed: one a self-contained mechanical indicating instrument for aircraft use, and the second an electromechanical computer system shown in a simplified manner to demonstrate the principles involved. This latter form may be greatly varied or used without the indicator shown to form a portion of a complex computer system.

While certain preferred embodiments of the invention have been specifically disclosed, it is understood that the invention is not limited thereto as many variations will be readily apparent to those skilled in the art and the invention is to be given its broadest possible interpretation within the terms of the following claims.

We claim:

1. A rate of change of velocity indicator comprising in combination, a first housing, a first pressure responsive element in said first housing and having a yielding wall separating the pressure in said pressure responsive element from the pressure in the remainder of said first housing and forming a first pair of chambers with said first housing, flow means connecting one of said first pair of chambers to a point of static pressure, flow restrictive means connecting the other of said first pair of chambers to the point of static pressure, a second housing attached to said first housing, a second pressure responsive element in said second housing and having a yielding wall separating the pressure in said pressure responsive element from the pressure in the remainder of said first housing and forming a second pair of chambers with said second housing, flow means connecting one of said second pair of chambers to a point of velocity pressure, flow restrictive means connecting the other of said second pair of chambers to the point of velocity pressure, whereby upon change of static and velocity pressure the displacements of the yielding walls of the first and second pressure responsive elements are substantially proportional to the pressure differentials existing between the first and second pairs of chambers, respectively, displaceable means actuated by the yielding walls of said pressure responsive elements to obtain the algebraic difference of said displacements, and indicator means controlled in accordance with the displacement of said displaceable means.

2. The combination as defined in claim 1 wherein the displaceable means comprises a plurality of electrical transducers, a computing system actuated by said transducers to obtain the algebraic difference between the electrical responses of said transducers.

3. A rate of change of velocity indicator comprising in combination, a first housing, a first pressure responsive element in said first housing and having a yielding wall separating the pressure in said pressure responsive element from the pressure in the remainder of said first housing and forming a first pair of chambers with said first housing, flow means connecting one of said first pair of chambers to a point of static pressure, flow restrictive means connecting the other of said first pair of chambers to the point of static pressure, a second housing attached to said first housing, a second pressure responsive element in said second housing and having a yielding wall separating the pressure in said pressure responsive element from the pressure in the remainder of said first housing and forming a second pair of chambers with said second housing, flow means connecting one of said second pair of chambers to a point of velocity pressure, flow restrictive means connecting the other of said second pair of chambers to the point of velocity pressure, whereby upon change of static and velocity pressures the displacements of the yielding walls of the first and second pressure responsive elements are substantially proportional to the pressure differentials existing between the first and second pairs of chambers, respectively, displaceable means actuated by the yielding walls of said pressure responsive elements to obtain the algebraic difference of said displacements, indicator means controlled in accordance with the displacement of said displaceable means, and said indicator means being compensated for thermal expansions and contractions by equal and opposing expansions and contractions of said first and second pressure responsive elements and by equal and opposing forces exerted on the yielding walls of said first and second pressure responsive elements by the gases in said first and second pairs of chambers.

4. The combination as defined in claim 3 wherein the displaceable means comprises a plurality of electrical transducers, a computing system actuated by said transducers to obtain the algebraic difference between the electrical responses of said transducers.

5. A rate of change of velocity indicator for aircraft comprising in combination, a first housing, a first pressure responsive element in said first housing and having a yielding wall separating the pressure in said pressure responsive element from the pressure in the remainder of said first housing and forming a first pair of chambers with said first housing, flow means connecting one of said first pair of chambers to a point of static pressure of the atmosphere through which the aircraft is flying, flow restrictive means connecting the other of said first pair of chambers to the point of static pressure of the atmosphere, a second housing attached to said first housing, a second pressure responsive element in said second housing and having a yielding wall separating the pressure in said pressure responsive element from the pressure in the remainder of said first housing and forming a second pair of chambers with said second housing, flow means connecting one of said second pair of chambers to a point of velocity pressure of the atmosphere, flow restrictive means connecting the other of said second pair of chambers to the point of velocity pressure, whereby upon change of static and velocity pressure the displacements of the yielding walls of the first and second pressure responsive elements are substantially proportional to the pressure differentials existing between the first and second pairs of chambers, respectively, displaceable means actuated by the yielding walls of said pressure responsive elements to obtain the algebraic difference of said displacements, indicator means controlled in accordance with the displacement of said displaceable means, said indicator means being compensated for thermal expansion and contraction by equal and opposing expansions and contractions of said first and second pressure responsive elements and by equal and opposing forces exerted on the yielding walls of said first and second pressure responsive elements by the gases in said first and second pairs of chambers.

6. A rate of change of velocity indicator comprising in combination, a first housing, a first pressure responsive element in said first housing and having a yielding wall separating the pressure in said pressure responsive element from the pressure in the remainder of said first housing and forming a first pair of chambers with said first housing, flow means connecting one of said first pair of chambers to a point of static pressure, flow restrictive means connecting the other of said first pair of chambers to the point of static pressure, a second housing attached to said first housing, a second pressure responsive element in said second housing and having a yielding wall separating the pressure in said pressure responsive element from the pressure in the remainder of said first housing and forming a second pair of chambers with said second housing, flow means connecting one of said second pair of chambers to a point of velocity pressure, flow restrictive means connecting the other of said second pair of chambers to the point of velocity pressure, whereby upon change of static and velocity pressure the displacements of the yielding walls of the first and second pressure responsive elements are substantially proportional to the pressure differentials existing between the first and second pairs of chambers, respectively, displaceable means actuated by the yielding walls of said pressure responsive elements to obtain the algebraic difference of said displacements, indicator means controlled in accordance with the displacement of said displaceable means, a third housing, attached to said first and second housing, a third pressure responsive element in said third housing and having a yielding wall separating the pressure in said pressure responsive element from the pressure in the remainder of said first housing and forming a third pair of chambers with said third housing, passage means connecting one of said third pair of chambers to said point of static pressure, passage means connecting the other of said third pair of chambers to said point of velocity pressure, means connecting said yieldable wall of said third pressure responsive element with said indicator to compensate for the larger differential pressure change at higher velocity for a given rate of change of velocity.

7. The combination as set forth in claim 6 wherein the displaceable means comprises a plurality of electrical transducers, a computing system actuated by said transducers to obtain the alegbraic difference between the electrical responses of said transducers, and wherein said third pressure responsive element and said means connecting said yielding wall of said third pressure responsive element with said indicators comprises an electrical transducer and associated electrical wiring.

8. A rate of change of velocity indicator comprising in combination, a first housing, a first pressure responsive element in said first housing and having a yielding wall separating the pressure in said pressure responsive element from the pressure in the remainder of said first housing and forming a first pair of chambers with said first housing, flow means connecting one of said first pair of chambers to a point of static pressure, flow restrictive means connecting the other of said first pair of chambers to the point of static pressure, a second housing attached to said first housing, a second pressure responsive element in said second housing and having a yielding wall separating the pressure in said pressure responsive element from the pressure in the remainder of said first housing and forming a second pair of chambers with said second housing, flow means connecting one of said second pair of chambers to a point of velocity pressure, flow restrictive means connecting the other of said second pair of chambers to the point of velocity pressure, whereby upon change of static and velocity pressure the displacements of the yielding walls of the first and second pressure responsive elements are substantially proportional to the pressure differentials existing between the first and second pairs of chambers, respectively, displaceable means actuated by the yielding walls of said pressure responsive elements to obtain the algebraic difference of said displacements, indicator means controlled in accordance with the displacement of said displaceable means, said indicator means being compensated for thermal expansions and contractions by equal and opposing expansions and contractions of said first and second pressure responsive elements and by equal and opposing forces exerted on the yielding walls of said first and second pressure responsive elements by the gases in said first and second pairs of chambers, a third housing, attached to said first and second housing, a third pressure responsive element in said third housing and having a yielding wall separating the pressure in said pressure responsive element from the pressure in the remainder of said first housing and forming a third pair of chambers with said third housing, passage means connecting one of said third pair of chambers to said point of static pressure, passage means connecting the other of said third pair of chambers to said point of velocity pressure, means connecting said yieldable wall of said third pressure responsive element with said indicator to compensate for the larger differential pressure change at higher velocities for a given rate of change of velocity.

9. A rate of change of velocity indicator for aircraft comprising, in combination, a first housing, a first pressure responsive element in said first housing and having a yielding wall separating the pressure in said pressure responsive element from the pressure in the remainder of said first housing and forming a first pair of chambers with said first housing, flow means connecting one of said first pair of chambers to a point of static pressure of the atmosphere through which the aircraft is traveling, flow restrictive means connecting the other of said first pair of chambers to the point of static pressure of the atmosphere, a second housing attached to said first housing, a second pressure responsive element in said second housing and having a yielding wall separating the pressure in said pressure responsive element from the pressure in the remainder of said first housing and forming a second pair of chambers with said second housing, flow means connecting one of said second pair of chambers to a point of velocity pressure of the atmosphere, flow restrictive means connecting the other of said second pair of chambers to the point of velocity pressure, whereby upon change of static and velocity pressures the displacements of the yielding walls of the first and second pressure responsive elements are substantially proportional to the pressure differentials existing between the first and second pairs of chambers, respectively, displaceable means actuated by the yielding walls of said pressure responsive elements to obtain the algebraic difference of said displacements, and indicator means controlled in accordance with the displacement of said displaceable means.

References Cited in the file of this patent

UNITED STATES PATENTS

| | | |
|---|---|---|
| 2,424,511 | Stanley et al. | July 22, 1947 |
| 2,550,603 | Russell | Apr. 24, 1951 |
| 2,606,444 | Brown et al. | Aug. 12, 1952 |
| 2,677,963 | Mullins et al. | May 11, 1954 |
| 2,706,407 | Hosford | Apr. 19, 1955 |